United States Patent
Krogager et al.

(10) Patent No.: US 8,097,198 B2
(45) Date of Patent: Jan. 17, 2012

(54) MANUFACTURING METHOD WITH VACUUM BAG

(75) Inventors: Max Krogager, Linköping (SE); Mathias Larsson, Linköping (SE); Claes Rudqvist, Linköping (SE); Jan Vaara, Linköping (SE)

(73) Assignee: SAAB AB, Linkoping (SE)

( * ) Notice: Subject to any disclaimer, the term of this patent is extended or adjusted under 35 U.S.C. 154(b) by 397 days.

(21) Appl. No.: 11/539,882

(22) Filed: Oct. 10, 2006

(65) Prior Publication Data

US 2007/0098930 A1   May 3, 2007

(30) Foreign Application Priority Data

Oct. 17, 2005   (EP) ..................................... 05109659

(51) Int. Cl.
*B29C 70/44* (2006.01)

(52) U.S. Cl. ........ 264/258; 264/571; 264/324; 264/239; 264/313; 264/135; 264/234; 425/504; 425/405.1

(58) Field of Classification Search .................. 264/468, 264/511, 526, 510, 258, 313, 521, 102, 257, 264/219, 234, 571, 517, 324, 239, 135; 425/504, 425/405.1

See application file for complete search history.

(56) References Cited

U.S. PATENT DOCUMENTS

| | | | |
|---|---|---|---|
| 5,597,435 A | 1/1997 | Desautels et al. | |
| 6,644,954 B2 * | 11/2003 | Sloman | 425/389 |
| 6,814,916 B2 * | 11/2004 | Willden et al. | 264/257 |
| 7,306,450 B2 * | 12/2007 | Hanson | 425/383 |
| 2003/0102604 A1 * | 6/2003 | Mack et al. | 264/511 |
| 2004/0219251 A1 * | 11/2004 | Eberth et al. | 425/520 |
| 2005/0006823 A1 * | 1/2005 | Merrick | 264/511 |
| 2006/0017200 A1 * | 1/2006 | Cundiff et al. | 264/511 |
| 2006/0170127 A1 * | 8/2006 | Hirayama et al. | 264/102 |

FOREIGN PATENT DOCUMENTS

| | | |
|---|---|---|
| GB | 2 184 053 A | 6/1987 |
| GB | 2 243 104 | 10/1991 |

OTHER PUBLICATIONS

Communication Pursuant to Article 94(3) EPC—Mar. 2, 2009.
European Search Report—Apr. 5, 2006.
Communication Pursuant to Article 94(3) EPC—May 3, 2010.

* cited by examiner

*Primary Examiner* — Khanh P Nguyen
*Assistant Examiner* — Keith Aziz
(74) *Attorney, Agent, or Firm* — Venable LLP; Eric J. Franklin

(57) ABSTRACT

A method for producing an article of composite material. A female molding tool is provided. A form bag is provided. At least one prepreg is placed in the molding tool. A heel shaped hard tool part. A hard tool part is placed at the female tool close to an edge of the laminate being placed in the mold. The form bag is placed in the female tool so that the bag seals towards the heel shaped tool part, in such a way that, at a later air evacuation of the bag, an increased pressure that the bag will apply towards the laminate reaches a radius before the pressure reaches an edge.

4 Claims, 1 Drawing Sheet

MANUFACTURING METHOD WITH VACUUM BAG

TECHNICAL FIELD

The present invention relates to methods and means for producing articles of composite material and also to articles produced by such a method. More specifically, the invention relates to articles made of fibre laminate and a matrix, e.g. epoxy resin.

BACKGROUND

Aircraft manufacturers are under an increasing pressure to produce light-weight, strong and resistant aircraft which also has the lowest productions costs and also low costs for maintenance during the entire lifetime of the aircraft. An aircraft must be strong enough to cope with stresses during take-off, high altitude cruising and landing, and at the same time it must be as easy as possible to maximise the performance of the aircraft. Partly because of this, aircraft manufacturers have started to use fibre reinforced resin matrix composites.

Such fibre reinforced resin matrix composites provide improved strength, wear resistance, rigidity and strength-weight relationship by comprising strong, rigid carbon fibres in a softer, more tensile resin matrix. The resin matrix material transmits forces to the fibres and provides stretching and toughness characteristics, since the fibres bear a major part of the applied forces.

Known methods for producing fibre reinforced resin matrix composites for an aircraft comprise that a number of so called prepreg sheets, or simply abbreviated as "prepregs" are put on top of each other in contact with a moulding tool. The prepreg consists of unidirectional fibres or multi-directional fibres in an uncured resin. A vacuum bag is placed over and is sealed towards the moulding tool so that the entire component is completely enclosed. Vacuum is then applied to the enclosed component so that the prepregs are becoming compacted towards the surface of the moulding tool. Finally the prepreg is cured, wherein the resin first assumes a low viscosity and fills out, subsequently the temperature is increased further and the resin cures. The temperature is then decreased and the object gets loose from the moulding tool. When producing e.g. a composite spar it is usually an advantage to have a female tool for obtaining good tolerances of the outer surfaces. It is often difficult to put the composite laminate down in the radii of the female tool, i.e. in inner corners, concave surfaces and similar. The composite laminate tends to hang up and form enclosures of air in the radii or corners having another shape than what is desired.

SUMMARY OF THE INVENTION

In one embodiment of a female tool according to the present invention, the female tool has been provided with a heel shaped hard tool part close to a becoming flange of the article that is to be produced, which e.g. may be a spar. The heel shaped hard tool part has been designed so that said part assures that the vacuum bag hangs free close to the edge of the flange, and when vacuum is activated this results in that the pressure that the vacuum bag applies reaches the laminate in the radius before it reaches the laminate in the flange. The laminate can hereby slide down in the radius, which then fits perfectly towards the surface of the female tool. When the vacuum bag is being stretched, it is successively pressed own alongside the flange and in this way captured air is pushed out towards the edge—which hinders formation of air holes in the manufactured article. You may also put it this way that an increase in pressure traverses from an inner part of the laminate surface to an outer part, so that possible air pockets in this way are given the possibility to emigrate out of the laminate.

The heel shaped hard tool part may also be exploited as a support for creating a fine edge on a manufactured end product—so called net moulding.

The heel shaped hard tool part may also be equipped with a shelf that may create correct thickness of the flange.

The present invention thus provides a method for producing an object of composite material comprising the steps of:
providing a moulding tool of female type;
providing a form bag;
placing one or several prepregs in the moulding tool;
providing a heel shaped hard tool part;
placing said hard tool part at the female tool close to an edge of the prepregs being placed in the mould;
placing the form bag in the female tool so that the bag seals towards said heel shaped tool part;
in such a way that at a later evacuation of the air in the bag, the increase in pressure that the bag will apply towards the laminate reaches a radius before it reaches an edge.

Furthermore there is provided a moulding tool for producing an object of composite material where the moulding tool is provided with a heel shaped hard tool part, which is arranged at the female mould so that it may be removed and adjusted, preferably so that its height may be adjusted.

Furthermore also objects produced by means of any of the above mentioned methods, and objects produced by exploiting any of the above mentioned tools, are provided.

BRIEF DESCRIPTION OF THE DRAWINGS

The above aspects and further advantages of the present invention will become more apparent when the following detailed description is read together with the accompanying drawings, in which.

DETAILED DESCRIPTION OF PREFERRED EMBODIMENTS

Figure 1:
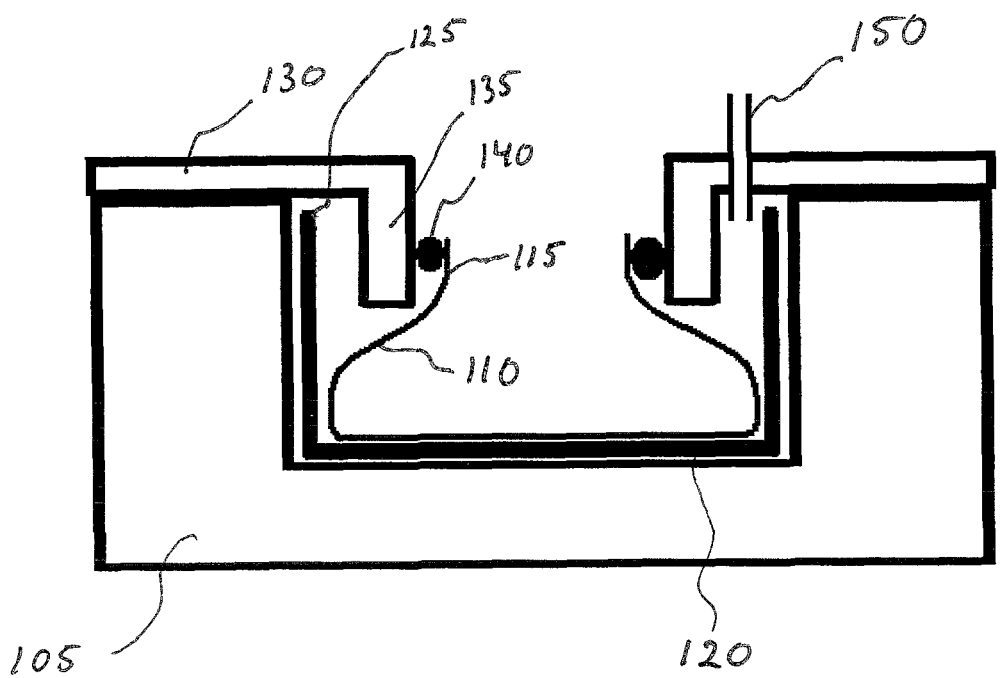
FIG. 1 shows a female tool provided with a heel shaped hard tool part and a hanging bag.

In the present specification, the following terms shall be interpreted as follows:

Prepreg—"Prepreg" shall here be interpreted as being a fibre tape or a fibre fabric or a non-woven fibre cloth or any other type of fibre layer, which has been impregnated with a heat curing matrix.

Matrix—"Matrix" shall here be interpreted to be a material which, as is well known in this technical field, binds together the fibres in a composite material, or a material which is used in order to bind together the fibres in a composite material.

Fibre tape—"Fibre tape" shall here be interpreted as being a fibre layer in which the fibres are oriented substantially in one single direction.

Fibre fabric—"Fibre fabric" shall here be interpreted to be a fibre layer in which the fibres are oriented in two or more direction, and in which the fibres in the different directions are woven or twisted together in some way.

Stack—"Stack" or "fibre stack" shall here be interpreted to be a number of prepregs put on top of each other.

Downforming—"Downforming" shall here be interpreted to be the process of applying a pressure on a prepreg being placed on a moulding tool, said pressure being applied in a specific direction in order to make the prepreg to better follow the moulding tool. Usually this pressure is created by means of vacuum.

Cure—"To cure" and "curing" shall here be interpreted the chemical reaction, often thermally-controlled, resulting in that the resin in the prepregs becomes hard and the produced component gets its final shape and rigidity.

In a preferred embodiment for a method for producing a spar, a female tool is provided with a heel shaped hard tool part. The heel shaped hard tool part is preferably arranged close to a flange of the spar.

The heel shaped hard tool part is arranged to make sure that a vacuum bag hangs free close to the edge of the flange and further to make sure that during air evacuation the vacuum bag reaches the laminate in the radius before said bag reaches the flange. This means that the increase in pressure that the bag creates reaches in inner surface of the composite before it reaches an outer surface closer to the edge of the object.

FIG. 1 shows a female tool 105 in which a composite material 120 has been placed. The female tool 105 is provided with a heel shaped hard tool part 130, in one embodiment in form of an L-shaped profile. Furthermore, there is a hanging vacuum bag placed on top of the composite material and is arranged to seal towards a surface of the heel shaped hard tool part 130 by means of a seal 140 arranged between the edge region 115 of the vacuum bag 110 and an overhanging portion 135 of said heel shaped hard tool part 130. Furthermore, there is arranged an airpump for vacuum 150 to evacuate air from the space being enclosed by the bag 110, the seal 140, the female tool 105 and the heel shaped hard tool part 130. The heel shaped hard tool part 130 is preferably arranged at the female tool 105 so that it may be adjusted, wherein it is particularly advantageous that the height of the heel shaped hard tool part 130 may be adjusted in order to, at a predefined and desirable flange thickness, be able to play with the height of the flange to some extent.

A method according to one embodiment of the present invention for providing a composite object comprises the steps of:
  providing a female tool;
  placing a prepreg stack in said tool;
  placing one or several heel shaped hard tool parts 130 at the female tool 105.
  placing a vacuum bag 110 in the female tool on top of the prepreg stack 120 so that the bag seals towards the heel shaped hard tool part 130.

When producing spars by means of the methods described above, it is advantageous that the female tool has been produced to have a length which by some margin is larger than the desired length of the spar, so that there is place available for the vacuum bag to seal towards the female tool outside the spar ends.

The invention claimed is:

1. A method for producing an article made of a composite material, the method comprising:
  providing a female molding tool;
  providing a form bag;
  placing at least one prepreg in the female molding tool;
  providing a heel shaped hard tool part;
  placing said heel shaped hard tool part at the female molding tool close to a peripheral edge of the at least one prepreg being placed in the female molding tool such that a portion of the heel shaped hard tool part overhangs a portion of the at least one prepreg in the vicinity of the peripheral edge;
  placing the form bag in the female tool so that the form bag forms a seal with said heel shaped tool part such that the heel shaped hard tool part and the form bag form a male molding tool, wherein the at least one prepreg is directly contacted more by the form bag than by the heel-shaped molding tool part; and
  evacuating air in a space being delimited by the form bag, the female tool and the heel shaped hard tool part such that the form bag first directly engages a central portion of the at least one prepreg within the female molding tool and applies pressure lastly to the portion of the at least one prepreg overhung by the heel shaped hard tool part.

2. The method according to claim 1, wherein the form bag directly engages the heel shaped hard tool part.

3. The method according to claim 1, wherein force applied to the heel shaped hard tool part by the form bag will not compress the at least one prepreg.

4. The method according to claim 1, wherein the form bag directly engages the at least one prepreg, thereby applying force to and compressing the at least one prepreg.

* * * * *